March 22, 1932. C. M. O'NEIL 1,850,214
PISTON SKIRT EXPANDER
Filed July 28, 1930

INVENTOR
CHARLES M. O'NEIL
BY
ATTORNEY

Patented Mar. 22, 1932

1,850,214

UNITED STATES PATENT OFFICE

CHARLES M. O'NEIL, OF HOPKINS, MINNESOTA

PISTON SKIRT EXPANDER

Application filed July 28, 1930. Serial No. 471,228.

This invention relates to improvements in internal combustion engines and the primary object is to provide simple, efficient and practical means for slightly expanding the skirt of a worn piston whereby its usefulness will be prolonged, and which expander may also be placed in new pistons if they are slightly undersized, or if the cylinder is slightly oversized from wear or otherwise, thus eliminating the objectionable "piston slapping" at a minimum expense and effort. Further and more detailed objects will appear in the course of the following specification, reference being had to the accompanying drawings, wherein:

Figure 1:
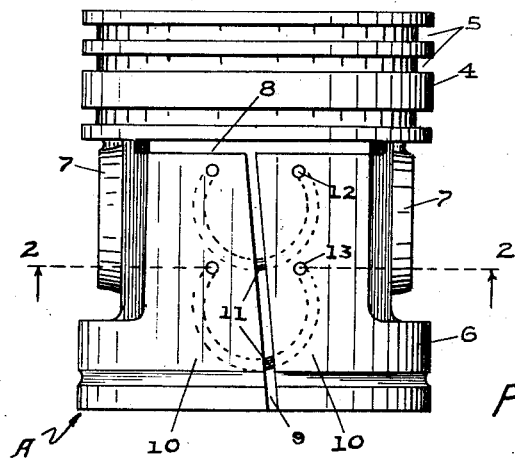
Fig. 1 is a side elevation of a piston showing the application thereto of my improved skirt expander.
Figure 3:
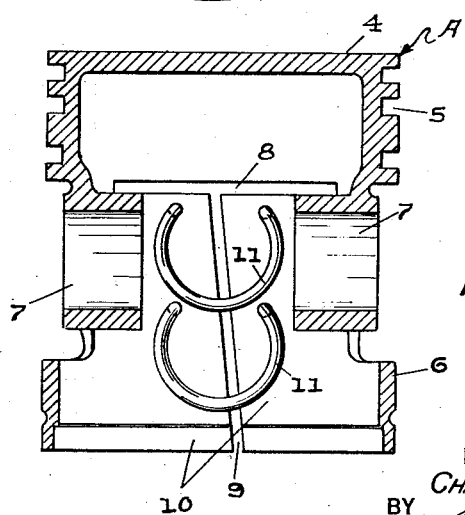
Fig. 3 is a sectional elevation taken diametrically from the piston as on the line 3—3 in Fig. 2.

Referring to the drawings more particularly and by reference characters, A designates a piston block which comprises a head portion 4 having annular grooves 5 for the piston rings, a skirt 6 extending downwardly from the head 4 and a pair of bearings 7 for the usual wrist pin of the connecting rod (not shown). The members 4, 6, and 7 are all integrally formed and are substantially rigid with respect to each other except that the skirt 6 is in part separated from the head 4 by a cross slot 8, and the skirt is split as by a substantially vertical slot 9 which joins with the slot 8, as shown in Figs. 1 and 3, thus forming a pair of adjacent wings 10 of the skirt 6.

The structure thus far described is of common and well known construction and design, and as is also known, the object of the slots 8 and 9 is to render the piston skirt 6 somewhat flexible so that it may yieldably contact with the cylinder wall of the engine. It is found, however, that unless the piston is perfectly fitted, or after a properly fitted piston has been used a sufficient length of time, the wear and use imparted to the piston results in a slight reduction in its diameter which in turn causes leakage of oil and what is commonly known as "piston slapping", both of which are extremely objectionable, and to my knowledge have heretofore only been corrected by reboring the cylinder and substituting the worn or improperly fitted piston with a new and larger one.

Figure 2:
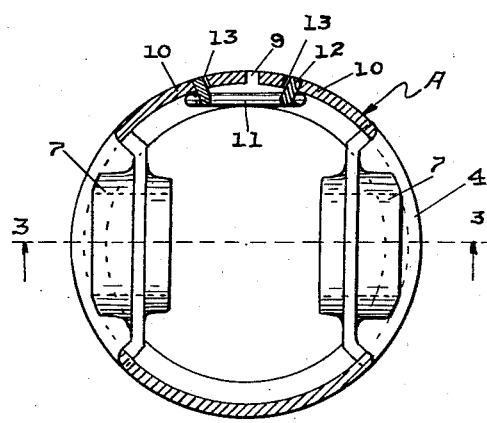
Fig. 2 is a cross section on the line 2—2 in Fig. 1.

With the above noted object, in view of prolonging the effective life and usefulness of a worn or improperly fitted piston, I provide a piston skirt expander in the form of a pair of spring spreaders 11, two of which are shown as being employed in the present case, although one may be sufficient under some circumstances, while more than two may be employed under other circumstances. Each spreader 11 consists of a horse-shoe or substantially U-shaped wire which is made of heavy spring steel and must be forced together before being secured in place in the piston. Each member 11 at its ends is provided with a pair of diverging extensions or lugs 12 which are inserted in previously drilled holes 13 at opposite sides of the slot 9. It will be noted, with particular reference to Fig. 2, that the holes 13 are not parallel but converge in the direction of the axis of the piston, with a result that the spring action imparted to the lugs 12 will cause the member 11 to adhere to the inner face of the piston wall so that it cannot become loosened under the jarring and vibratory strain to which the piston is subjected.

With the spreaders 11 in place it will be seen that they will act upon the wings 10 to slightly spread them apart, which spreading action is permitted by reason of the slots 8 and 9 which, as above noted, give the piston skirt proper a certain amount of resiliency. It will be obvious that the spreading action exerted by the members 11 will not be sufficient to distort or to even expand the skirt to any great extent, but it is found that they will increase the diameter of the skirt from approximately five to twenty ten-thousandths of an inch, depending upon the stiffness of the material used and the number of spreaders employed, and this amount of spreading action is sufficient to overcome the piston slapping as it is ordinarily found to exist.

It is understood that suitable modifications may be made in the structure as disclosed, provided such modifications come within the scope of the appended claims.

Having now therefore fully illustrated and described my invention, what I claim to be new and desire to protect by Letters Patent is:

1. The combination with a piston having a skirt provided with a slot to permit expansion thereof, of an expander comprising a spring member disposed in a vertical plane adjacent the inner face of the piston skirt and connecting portions of the skirt at opposite sides of the slot and exerting a spreading action on the skirt portions, said spring member being substantially U-shaped.

2. The combination with a piston having a skirt provided with a slot to permit expansion thereof, of an expander comprising a spring member connecting portions of the skirt at opposite sides of the slot and exerting a spreading action on the skirt portions, said spring member being substantially U-shaped and having a pair of lugs at its ends for positive engagement with the piston skirt at opposite sides of the said slot.

3. The combination with a piston having a skirt provided with a slot to permit expansion thereof, of an expander comprising a spring member connecting portions of the skirt at opposite sides of the slot and exerting a spreading action on the skirt portions, said spring member having a pair of diverging lugs at its ends for engagement with the skirt.

4. The combination with a piston having a skirt provided with a slot to permit expansion thereof, of an expander comprising a spring member connecting portions of the skirt at opposite sides of the slot and exerting a spreading action on the skirt portions, said spring member having a pair of diverging lugs at its ends, and said skirt portions being provided with diverging holes to detachably receive the lugs.

5. A piston skirt expander comprising a substantially U-shaped spring member having a pair of diverging lugs at its ends for interlocking engagement with the skirt.

6. The combination with a piston having a skirt provided with a slot to permit expansion thereof, of an expander comprising a pair of springs disposed one above the other adjacent the slot and upon the inner side of the skirt, the ends of said springs being provided with offset lug portions for positively engaging the skirt at points on opposite sides of the slot.

7. The combination with a piston having a skirt provided with a slot to permit expansion thereof, of an expander comprising a pair of springs disposed one above the other and across the slot and upon the inner side of the skirt and with their ends in positive engagement with the skirt at opposite sides of the slot, said springs being disposed in a common plane parallel with the axis of the piston.

8. An expander for a slotted piston skirt comprising a spring member disposed on the inner side of the skirt and across the slot therein, said member being provided at its ends with lugs for detachable engagement in perforations in the skirt one perforation at each side of and adjacent to the slot.

Signed at Minneapolis, Minnesota, this 26th day of July, 1930.

CHARLES M. O'NEIL.